Patented Aug. 11, 1953

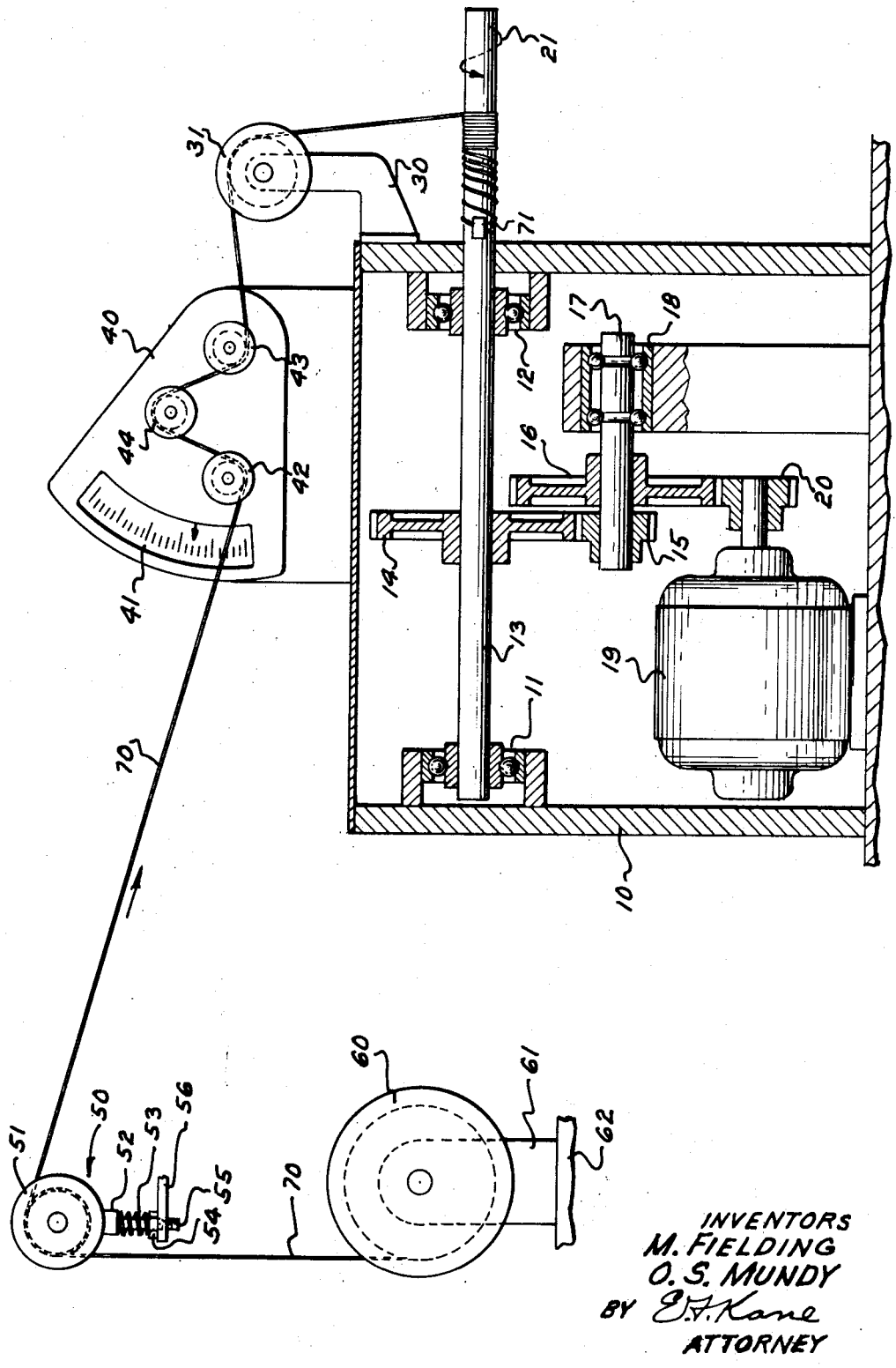

2,648,223

UNITED STATES PATENT OFFICE 2,648,223

METHOD OF TESTING THE WINDING PROPERTIES OF FILAMENTS

Melvin Fielding, Chicago, and Otto S. Mundy, Wheaton, Ill., assignors to Western Electric Company, Incorporated, New York, N. Y., a corporation of New York Application July 21, 1950, Serial No. 175,116

3 Claims. (Cl. 73—160)

This invention relates to a method of determining the winding properties of filamentary materials and more particularly to a method of determining whether or not a strand of wire or like material has present on the outer surface thereof sufficient lubrication to render it acceptable for winding on a spool or the like.

In the manufacture of wire to be used for electrical purposes and particularly for use in winding electromagnetic and inductance coils, the wire is generally provided with a thin enamel or other hard insulating coating. During the application of such coating a certain amount of lubricant is generally provided for reasons which will hereinafter appear. In some instances, however, the wire in its final coated state appears without sufficient surface lubrication characteristics and such wire presents several undesirable characteristics in the further use of the wire in forming coils or the like.

As examples of the problems encountered, wire, as it comes from the coating apparatus is ordinarily wound on spools after which the filled spools are placed on automatic coil winding machinery where electrical coils are formed while withdrawing the wire from the spools. The first problem encountered in this overall operation is in the winding of the wire on the spool. If the wire is dry or has insufficient lubricant on its outer surface, the wound wire tends to form a loose mass on the spool, and it has been found that this condition results from a tendency of the wire to wind back or double back on itself during the winding thereof regardless of the fact that a wire guide is traversing the spool during the winding operation. The difficulty thus arising may be attributed to the lack of lubrication between successive turns of wire in the layers as they are wound. It is obvious that such conditions result in a filled spool having many voids or vacant areas therein due to the unevenness of the windings thus directly affecting the amount of wire that can be wound on a spool. In addition, the poorly spaced turns have a decided adverse effect on the ultimate coil winding operation since the turns tend to become entangled as they are withdrawn from the spool.

In the winding of electrical coils, the problem is even more serious since the coils are required to meet rigid electrical and physical specifications. In using dry wire, the same problem arises in coil winding as in spooling, namely, the turns tend to stack up rather than to form a continuous flat layer. As the coil winding progresses under such conditions the diameter of the coil is increased unduly, which results in the wire forming the required number of turns being longer than desired; consequently the resistance of the coil is increased beyond its desired value.

It is an object of this invention to provide a method whereby it may be definitely determined whether or not the surface of a strand of filamentary material has the required surface lubrication characteristics which are necessary to efficiently wind such material into superposed layers on a spool or mandrel.

In accordance with one embodiment of the invention a rotatable mandrel is provided, and a strand of wire of acceptable surface lubrication characteristics is directed to the mandrel from a fixed guide point. The wire, while being maintained under a predetermined tension, is wound around the mandrel until it begins to double back after which the point of doubling back is noted. Any wire of the same diameter but of unknown surface lubrication characteristics may then be substituted for the acceptable wire after which the winding process is repeated. A sufficient amount of lubrication is then indicated on the surface of any unknown wire that does not double back before the double back point previously observed for the acceptable wire is reached.

A more complete understanding of the invention may be had by reference to the following detailed description when read in conjunction with the accompanying single figure drawing illustrating one form of apparatus which may be employed to practice the method of the invention.

Referring to the drawing, the apparatus consists of a casing 10 having a pair of bearing members 11 and 12 suitably secured to the inner surfaces of two opposed vertical walls thereof. The bearing members 11 and 12 support for free rotation therein a mandrel 13 one end of which extends outwardly from the casing 10 for purposes which will be hereinafter described. The mandrel 13 is adapted to be rotated by means of a gear wheel 14 suitably secured thereto and driven through a series of speed reducing gears 15 and 16 which are supported upon a shaft 17 suitably journaled in a bearing 18. A motor 19 is located within the casing 10 and the motor 19 is connected to drive a gear 20 which is meshed with the speed reduction gear 16. The direction of rotation of the motor 19 is such that the mandrel 13 is rotated in the direction of the arrow 21.

The casing 10 also has secured thereto a bracket 30 which supports for free rotation thereon a guide sheave 31. The bracket 30 and sheave 31 are rigidly fixed in position so that the only relative movement between the mandrel 13 and the guide sheave 31 is rotative movement.

The apparatus further consists of a tension measuring device 40 having an indicating panel 41 thereon for indicating the tension in a wire which is threaded around a pair of fixed guide rollers 42 and 43 and a floating guide roller 44. By observing the tension in a wire passing around the guide rollers 42, 43 and 44, as indicated on the panel 41 such tension may be regulated and maintained at a constant value by means of a tensioning device 50. The tensioning device 50 consists of a sheave 51 around which at least one complete turn of the wire is taken. The speed of rotation of the sheave 51 may be varied in accordance with the desired tension in the wire passing therearound by means of a braking pad 52 which is adapted to be urged against the outer periphery of the sheave 51 by means of a compression spring 53, the compression of which may be varied by means of a nut 54. The braking pad 52 is carried by a stud member 55 having one end thereof suitably threaded to receive the nut 54 and the compression spring 53 is positioned between the nut 54 and the braking pad 52 coaxial with the stud member 55. The complete braking assembly may be secured to a suitable support (not shown) by means of a bracket 56.

In carrying out a determination according to the method, the wire to be tested is ordinarily received on a supply reel 60 and such reel may be suitably held for rotation by one or more brackets 61 secured to a base 62. To carry out a test according to the method a reel 60 having a continuous strand of wire 70 wound thereon is first secured in the bracket 61. The wire 70 is then wound around the tensioning sheave 51 after which it is threaded through the tension measuring device 40. The wire 70 is then threaded around a portion of the guide sheave 31 after which the end of the wire is temporarily secured to a point on the mandrel 13 outside the casing 10 by means of a piece of adhesive material 71. The position at which the end of the wire 70 is secured to the mandrel 13 is not critical except for the fact that the wire should be secured at a point such that the first few turns of wire formed by rotation of the mandrel 13 will not be in abutting relationship with each other. As the mandrel rotates, the convolutions of wire get closer and closer together until they pass a point determined by a line drawn tangential to the guiding surface of the sheave 31 perpendicular to and intersecting the mandrel 13. At this point on the mandrel 13 the convolutions begin to become spaced in abutting relationship and as rotation of the mandrel 13 continues abutting convolutions continue to be formed until a point is reached where the surface lubrication characteristics of the wire are no longer such that the convolutions tend to slide down onto the mandrel. At this point the winding begins to wrap back or double back. By first employing a wire 70 having surface lubrication characteristics of an acceptable value, as determined by winding it on a spool or mandrel in the manner in which the material to be tested is to be used, and observing the point on the mandrel 13 at which the doubling back of the turns first occurs, any wire of similar diameter but having unknown surface lubrication characteristics may then be subjected to the same test to determine whether or not it has sufficient surface lubrication. Wire of the same diameter subjected to the same conditions of tension and speed of mandrel rotation may thus be examined to determine the sufficiency of surface lubrication thereon. If the wire under test begins to double back before a similar wire of acceptable characteristics it is immediately determined that the unknown wire under test is not acceptable.

Although a specific form of tensioning device and a specific form of tension measuring device have been shown and described in connection with the method, it is obvious that many other types of tension regulating and tension measuring devices may be employed without changing the results obtained by the method.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A method of determining the surface lubrication characteristics of wire which includes winding a length of wire around a rotating mandrel while maintaining a predetermined tension thereon, maintaining the guide point at which said wire is directed to the mandrel fixed, and measuring the axial distance of the convolutions of wire formed between the intersection of a line through said guide point normal to the axis of said mandrel and the point at which the convolutions start to double back to start a second layer.

2. The method of determining the winding characteristics of a filament, which comprises continuously winding a filament under constant tension on a mandrel from a fixed guide point starting at a point on the mandrel on one side of a line from the fixed guide point perpendicular to the mandrel to a point on the mandrel on the other side of said line at which the filament starts a second layer, and measuring the distance along the mandrel from said line to said last-mentioned point at which the second layer begins.

3. The method of determining the winding characteristics of a filament, which comprises continuously winding on a mandrel a filament under constant tension extending from a substantially fixed guide point to the mandrel until the filament starts a second layer on the mandrel, and measuring the distance along the mandrel from the last wound end of the first layer to a point on the mandrel at which a line normal to the mandrel and passing through said fixed guide point intersects the mandrel.

MELVIN FIELDING.
OTTO S. MUNDY.

References Cited in the file of this patent

UNITED STATES PATENTS

| Number | Name | Date |
|---|---|---|
| 2,049,951 | Doan | Aug. 4, 1936 |

FOREIGN PATENTS

| Number | Country | Date |
|---|---|---|
| 622,773 | Germany | Dec. 5, 1935 |